Aug. 18, 1953

J. F. SHUMAKER 2,649,170

AUTOMATIC SLACK ADJUSTER

Filed July 12, 1950

INVENTOR
John F. Shumaker.

BY Scrivener + Parker

ATTORNEYS

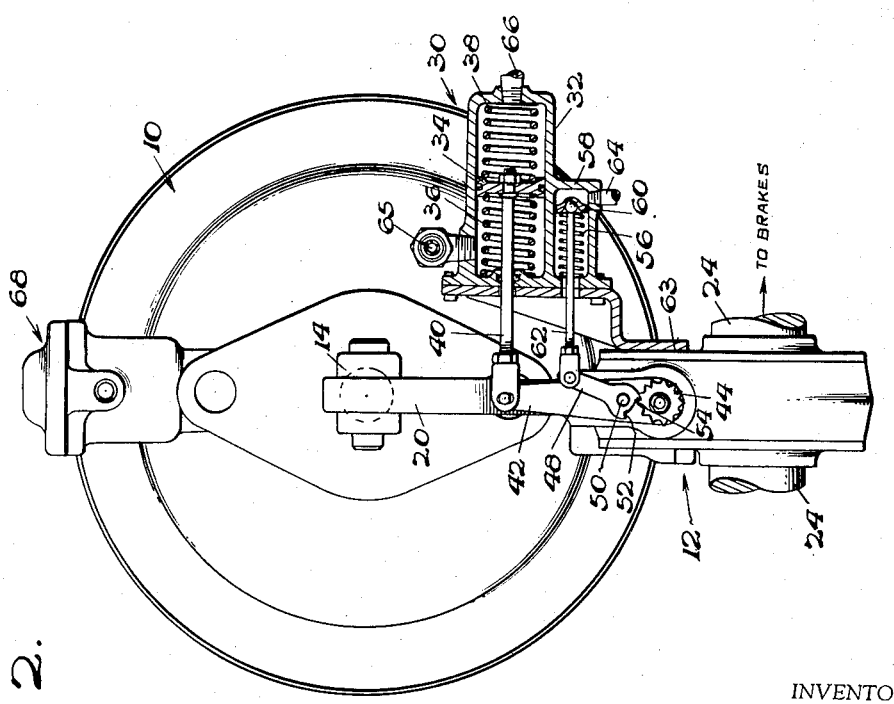

Patented Aug. 18, 1953

2,649,170

UNITED STATES PATENT OFFICE 2,649,170

AUTOMATIC SLACK ADJUSTER

John F. Shumaker, Elyria, Ohio, assignor to Bendix-Westinghouse Automotive Air Brake Company, Elyria, Ohio, a corporation of Delaware Application July 12, 1950, Serial No. 173,337

12 Claims. (Cl. 188—196)

This invention relates to brake slack adjusters and more particularly to a novel arrangement whereby the slack in the brake system may be either automatically reduced or automatically increased.

The principal object of the present invention is to provide a novel slack adjuster construction which is especially adapted for use in connection with fluid pressure operated vehicle brake systems, the construction being such that the slack in the brake system is automatically adjusted and maintained between predetermined limits.

Another object of the invention is to provide an arrangement of the above character which embodies a novel adjusting mechanism which functions in an automatic manner to maintain the proper amount of slack in the vehicle braking system, regardless of wear of the brake linings or expansion and contraction of the brake drums.

Still another object is to provide an automatic double-acting slack adjuster which is operable in response to the fluid pressure utilized for applying the vehicle brakes.

A further object includes the provision of a novel construction wherein the slack may be automatically decreased or increased, dependent upon the travel of the brake actuator in applying the vehicle brakes.

A still further object includes the use of a double-acting ratchet construction which functions to operate the slack adjuster in a novel manner.

Still another object resides in providing a simplified arrangement of parts, all of which cooperate in a highly effective manner to maintain the proper amount of slack in the vehicle braking system.

Other objects and novel features of the invention will appear more fully hereinafter from the following detailed description of the invention, when taken in connection with the accompanying drawings. It is to be expressly understood, however, that the drawings are utilized for purposes of illustration only and are not designed as a definition of the limits of the invention, reference being had for this purpose to the appended claims.

Referring to the drawings wherein similar reference characters refer to similar parts throughout the several views:

Fig. 2 is an end view of the slack adjuster and illustrates in section, the slack adjuster motor and the fluid pressure device for operating the ratchet reversing lever, and Fig. 3 is a detail view partly in section, and shows the connections between the ratchet mechanism and the slack adjuster worm shaft.

Figure 1:
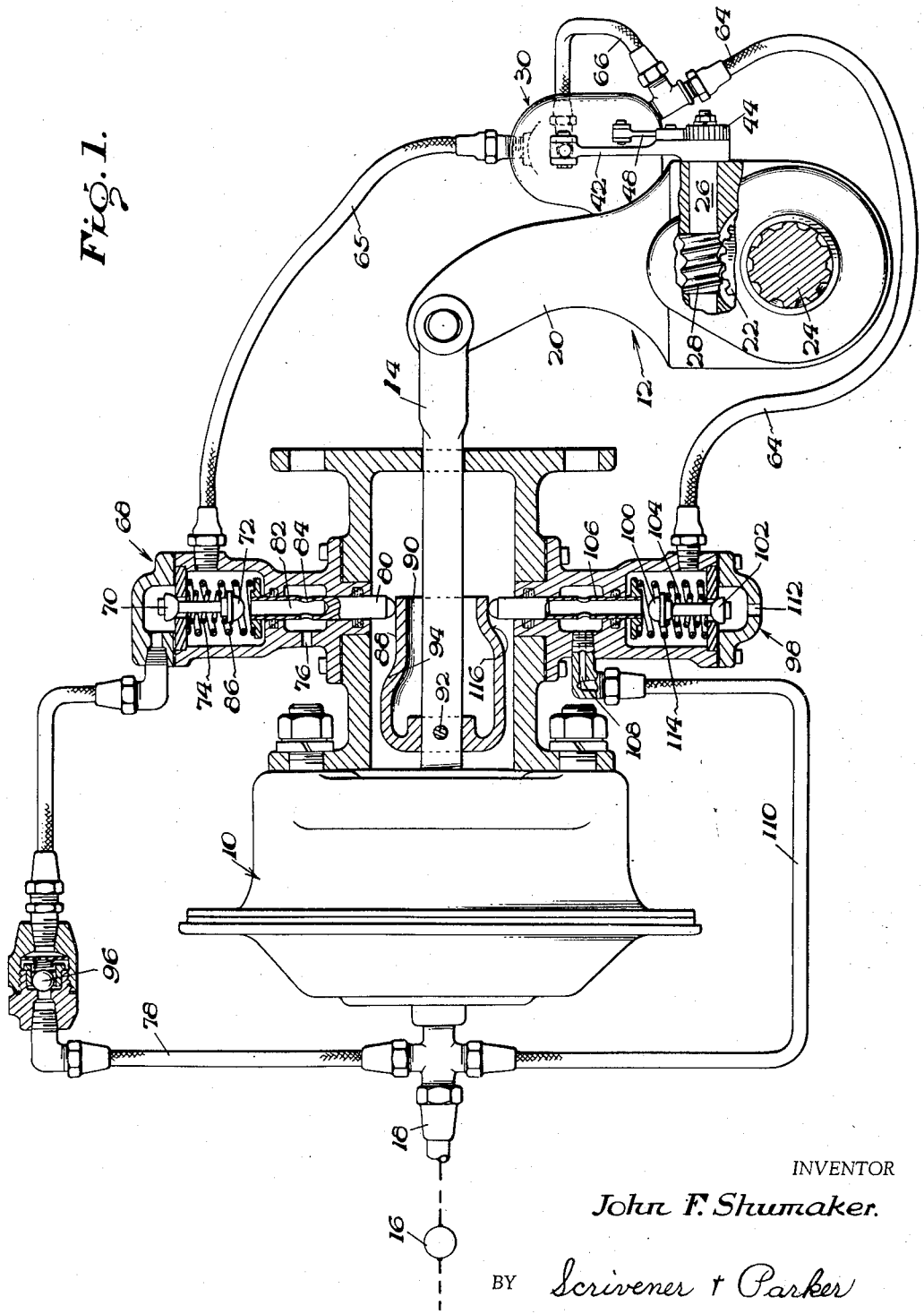
Fig. 1 is a diagrammatic view, partly in section of a slack adjuster constructed in accordance with the present invention.

Referring more particularly to Fig. 1, the present invention is illustrated therein in combination with a brake actuator 10 and a slack adjuster 12 of well known construction. More particularly, the actuator 10 includes a diaphragm or other pressure responsive element which may be moved to the right in order to actuate a push rod 14, in response to the application of fluid pressure, such as compressed air thereto by means of any suitable type of brake valve 16 which is connected to the left side of the actuator 10 by a supply conduit 18. The slack adjuster 12 is of the type which includes a body portion 20, operatively connected at one end to the push rod 14, and rotatably housing a worm 22 to which a brake operating cam shaft 24 is splined. A worm shaft 26 having a worm 28 engaged with the worm wheel 22, is rotatably mounted in the body 20 and may be rotated in either of opposite directions in order to decrease or increase the slack between the push rod 14 and the vehicle brakes. It will be understood that the worm 28 is substantially self-locking and that due to this construction, the brake operating cam shaft 24 will be moved in a clockwise direction during brake applying movement of the push rod 14. It will also be understood that in the event the worm shaft 26 is moved in one direction, such operation causes relative movement between the worm wheel 22 and the body 20 in order to decrease the slack in the brake system. On the other hand, rotation of the worm shaft 26 in the opposite direction will serve to increase the slack in the brake rigging.

The main feature of the present invention resides in a novel construction for either decreasing the slack in the brake system or increasing such slack, the arrangement thus maintaining the slack adjustment substantially between predetermined limits. Preferably, the adjustments are made in an automatic manner during operation of the braking system and are dependent upon the extent of travel of the push rod 14. More particularly, the construction for decreasing the slack includes a double acting fluid motor 30 comprising a cylinder 32 having a double acting piston 34 therein, the piston normally occupying a central position determined by the opposing action of centering springs 36 and 38. A piston rod 40 is connected with the piston 34 and has its free end pivotally connected with the upper end of a ratchet arm 42 which is rotatably mounted on the worm shaft 26. A ratchet wheel 44 is keyed at 46 to the worm shaft 26 and such wheel and the arm 42 are interconnected by means of a ratchet reversing lever 48 which is pivotally mounted on the arm 42 as by means of a pin 50. As shown more particularly in Fig. 2, the ratchet reversing lever 48 is provided with a pair of spaced-apart pawls 52 and 54, the latter being normally maintained in the position shown by the action of a spring 56 which is housed within a ratchet reversing cylinder 58. In this manner, the ratchet reversing lever 48 is normally urged in a clockwise direction about the pin 50 through cooperation between the spring 56 and a piston 60 which is secured to the right hand end of a rod 62, the left end of which is pivotally connected to the free end of the reversing lever 48. The motor 30 and the cylinder 58 may be mounted upon a suitable bracket 63 which may be carried by the body 20 of the slack adjuster.

With the above construction, it will be readily understood that fluid pressure admitted to the left hand end of the fluid motor 30 by way of a conduit 65 may, under conditions to be more fully pointed out hereinafter, move the piston 34 to the right in order to rotate the arm 42 in a clockwise direction about the worm shaft 26. During this action, the ratchet reversing lever 48 is likewise moved in a clockwise direction about the worm shaft 26, this movement being due to the pivotal connection between parts 42 and 48 at 50. Since the detent 54 is in engagement with one of the teeth of the ratchet wheel 44, it will be seen that the above described movement of the lever 48 will serve to rotate the ratchet wheel 44 and the worm shaft 26 to which it is connected, in a clockwise direction, this movement serving to decrease the slack in the vehicle braking system. Upon release of fluid pressure from the motor 30, the centering springs 36 and 38 will return the piston 34 to its normal central position illustrated in Fig. 2, and will return the arm 42 and the lever 48 to their normal positions. As the lever 48 returns to said normal position, it will be readily understood that the pawl 54 slips over the teeth of the ratchet wheel 44, this action being enabled through the use of the spring 56 which is associated with the lever 48 as heretofore stated. With the parts in the normal position illustrated, it is to be pointed out that the pawl 54 and the lever 48 are so arranged as to positively lock the slack adjuster against any possibility of backing off due to substantial braking torques. Such backing off or release of the adjuster would tend to effect a rotation of the ratchet wheel 44 in a counterclockwise direction, as viewed in Fig. 2, and this action is prevented by the construction just described.

In the event that it is desired to increase the slack in the brake system, fluid pressure is simultaneously admitted to the ratchet reversing cylinder 58, through a conduit 64 and to the right hand end of the fluid motor 30 through a conduit 66. Under conditions to be more fully pointed out hereinafter, the piston 60 will be moved to the left in order to reverse the position of the ratchet reversing lever 48. This movement of the lever 48 moves the pawl 54 out of engagement with respect to the ratchet wheel 44 and moves the pawl 52 into engagement with one of the teeth of the ratchet wheel. Also, piston 34 of the fluid motor 30 moves toward the left and effects a counterclockwise movement of the arm 42 and the lever 48 with respect to the worm shaft 26. Since the pawl 52 engages the ratchet wheel 44, it will be readily understood that the latter and the worm shaft 26 will be rotated in a counterclockwise direction in order to increase the slack in the brake rigging. As the pressure in conduits 64 and 66 is lowered, due to connection thereof with the atmosphere, the arm 42 and lever 48 move clockwise due to the action of the centering springs 36 and 38. During this operation, ratcheting occurs as the pawl 54 rides over the teeth of the ratchet wheel 44, the fluid pressure in the cylinder 58 functioning as an air spring during this phase of the operation of the parts. When arm 42 finally assumes the normal position shown in Fig. 2 and the spring 56 overcomes the fluid pressure remaining in the cylinder 58, the lever 48 will again be returned to its normal position, as illustrated in Fig. 2 where the pawl 54 will again lock the worm shaft 26 against any tendency toward backing off during subsequent braking operations.

A novel construction is provided for controlling the application of fluid pressure to and the exhaust of fluid pressure from the left hand end of the fluid motor 30 for the purpose of decreasing the slack. As illustrated, such construction includes a valve device 68 having a normally closed intake valve 70 and a normally open exhaust valve 72, these valves being interconnected and being urged to the position shown in Fig. 1 as by means of a valve spring 74. In the normal position, communication between conduit 65 and an exhaust port 76 is established while communication between the conduit 65 and a conduit 78, connected with the supply conduit 18, is interrupted. Thus, with the parts occupying their normal positions, no air pressure is present at the left hand end of the motor 30.

In order to control the operation of the valves 70 and 72, the invention provides a valve operating plunger 80 which is provided with a bore 82 and a series of ports 84 for connecting the exhaust port 76 with the conduit 65 when the exhaust valve 72 is open. The plunger 80 is constantly urged, as by means of a spring 86, to a position where the lower end of the plunger engages a cam surface 88 formed on a valve operating member 90 which is secured to the push rod 14 at 92. The cam surface 88 is provided with a substantially straight portion which corresponds to the normal travel of the push rod 14 when the slack is properly adjusted. Such surface is also provided with a rising cam 94 which, when the slack in the vehicle braking system is excessive, serves to engage the lower end of the plunger 80 and move the same upwardly. When this occurs, the exhaust valve 72 is closed and the intake valve 70 is opened. Fluid pressure admitted through the brake valve 16 and the supply conduit 18 thereupon flows past a one-way check valve 96 to the left hand end of the fluid motor 30 by way of the open intake valve 70 and the conduit 65. Due to the fact that the brakes are in their applied position, the piston 34 will not move. However, upon movement of the brake valve 16 to exhaust position and return of the push rod 14 to the normal brake released position, the intake valve 70 will close and the exhaust valve 72 will be opened. The residual air within the left end of the fluid motor 30 will thereupon move the piston 34 to the right, as viewed in Fig. 2, and effect a decrease in the slack of the brake system through the arm 42, lever 48, ratchet wheel 44 and worm shaft 26 as heretofore stated in detail. In order to ensure that the residual air within the fluid motor 30 will not be exhausted too rapidly before the described operations take place, it is preferred that the exhaust port 76 be provided with a suitable restriction. Also, the use of the check valve 96, which prevents flow of fluid pressure from the valve device 68 to the conduit 78, ensures that all of the fluid pressure within the fluid motor 30 will be exhausted through the exhaust port 76. Thus, the use of such valve ensures a sufficient amount of fluid pressure to actuate the piston 34 in the manner aforesaid.

In the event that the travel of the push rod 14, and hence the slack in the brake system, has been reduced to a minimum, there may be some danger of the brakes becoming locked due to brake drum contraction after brake drum expansion and adjustment has taken place. In such event, the present invention provides a novel arrangement for increasing the slack. More particularly, such means includes a valve device 98 which embodies a normally open intake valve 100 and a normally closed exhaust valve 102, these valves being interconnected and being normally held in the position illustrated in Fig. 1 as by means of a spring 104. In this position of the parts, conduit 64 leading to the ratchet reversing cylinder 58 and to the right hand end of the fluid motor 30 is connected to the supply conduit 18 by means of the open valve 100, a hollow plunger 106, a choke or restriction 108 and a conduit 110. Communication between the conduit 64 and an exhaust port 112 is interrupted by the closed exhaust valve 102. As shown, a spring 114 constantly urges the plunger 106 to a position such that the upper end thereof engages the cam surface 88.

It will be understood that in the event slack in the brake system is to be increased, the travel of the push rod 14 in the direction to apply the brakes, will be necessarily limited. Thus, under these conditions, such slight movement of the push rod 14 will not be of sufficient extent to bring a cam surface 116 into engagement with the upper end of the plunger 106. Hence, the intake valve 100 will remain open and will serve to conduct fluid pressure from the supply conduit 18 to the cylinder 58 and the right hand end of the fluid motor 30 when the brakes are applied under these conditions. As will be understood, fluid pressure from the supply conduit 18 will flow to the conduit 64 by way of conduit 110, the choke 108, the hollow plunger 106 and past the open inlet valve 100. When the connected conduits 64 and 66 are thus charged with fluid pressure, the reversing ratchet lever 48 will be moved counterclockwise about its pivot 50 in order to bring the pawl 52 into engagement with the ratchet wheel 44. The piston 34 will not be moved as long as the brakes are in applied condition. However, as soon as the brake valve 16 moves to its exhaust position, the piston 34 will move to the left, as viewed in Fig. 2, in order to effect a counterclockwise movement of the arm 42 and the lever 48 and to subsequently rotate the worm shaft 26 in such a direction as to increase the slack in the braking system. Thus, even though the conduit 64 is connected past the open valve 100 with the brake valve 16 when the latter moves to exhaust position, due to the restriction 108, sufficient residual fluid pressure will be present in the fluid motor 30 in order to effect the aforementioned movement of the piston 34 for the purpose of increasing the slack.

It will be noted that during normal application of the brakes with the existence of a normal slack, there will be a tendency for fluid to flow from the supply conduit 18 to the conduit 64 by way of conduit 110 and the open inlet valve 100. However, the choke 108 effectively prevents sufficient fluid pressure from building up in the cylinder 58 and the fluid motor 30 to operate the pistons 60 and 34. Also, the abrupt cam surface 116, during normal brake applications, moves the plunger 106 downwardly as viewed in Fig. 1, in order to close the inlet valve 100 and open the exhaust valve 102. This action ensures that the conduits 64 and 66 will be connected with the exhaust port 112 during normal brake applications.

In operation, and assuming the parts occupy the positions illustrated in the drawings, the present invention will serve to automatically maintain the travel of the push rod 14 and consequently the slack in the brake system, substantially between predetermined limits. For example, if the slack is proper, the travel of the push rod 14 will be such that the lower end of the plunger 80 will ride along the straight surface 88. Hence during operation of the brake valve 16, no fluid pressure will be conducted to the conduit 65 because of the closed inlet valve 70. While some fluid pressure may be conducted to the conduit 64 past the choke 108, such pressure will be insufficient to actuate the pistons 60 or 34. Also, as soon as the upper end of the plunger 106 engages the abrupt cam 116, the inlet valve 100 will be promptly closed and the conduit 64 will be connected with the exhaust port 112 past the open exhaust valve 102.

In the event that the travel of the push rod 14 becomes excessive, the cam surface 94 engages the plunger 80, moving the same upwardly to close the exhaust valve 72 and open the inlet valve 70. Under these conditions, fluid pressure is conducted to the left hand end of the fluid motor 30 by way of the supply conduit 18, conduit 78 and conduit 65. Thereupon, the slack is automatically decreased, as heretofore pointed out in detail, as soon as the brake chamber 10 is de-energized and the load is removed from the slack adjuster 20.

On the other hand, should the adjustment of slack be reduced to a minimum, repeated applications of the brake valve 16 will serve to repeatedly charge the cylinder 58 and the right hand end of the fluid motor 30 with fluid pressure by way of the open inlet valve 100 of the valve device 98. Release of the slack under these conditions is brought about by a reversal of the position of the ratchet reversing lever 48 and a counterclockwise movement of the arm 42, all as hereinbefore specifically pointed out. As soon as the slack is increased to the proper value, the abrupt cam surface 116 will serve to move the plunger 106 downwardly and close the inlet valve 100. This action automatically restores the parts to the normal slack position.

While one embodiment of the invention has been disclosed and described herein with considerable particularity, it will be well understood by those skilled in the art that various modifications may be resorted to without departing from

What is claimed is:

1. An automatic slack adjuster for vehicle brakes, comprising a brake operating shaft for applying the brakes, a fluid pressure actuator, a slack adjuster operatively connecting the shaft and actuator for rotating the shaft when the actuator is energized, said slack adjuster including a body member, a worm wheel carried thereby and connected with said shaft, and a worm engaged with said worm wheel and rotatably mounted in said body member for adjusting the position of the worm wheel to take up the slack in the brakes, fluid pressure operated means for rotating said worm, means including a conduit for charging said actuator, a second conduit connecting the actuator and fluid pressure operated means, a normally closed valve in the second conduit, and means dependent upon a predetermined extent of movement of the actuator for opening said valve.

2. An automatic slack adjuster for vehicle brakes, comprising a brake operating shaft for applying the brakes, a fluid pressure actuator, a slack adjuster operatively connecting the shaft and actuator for rotating the shaft when the actuator is energized, said slack adjuster including a body member, a worm wheel carried thereby and connected with said shaft, and a worm engaged with said worm wheel and rotatably mounted in said body member for adjusting the position of the worm wheel in opposite directions to respectively reduce or increase the slack in the brakes, means including a double acting fluid motor for rotating said worm in opposite directions, means for charging said actuator with fluid pressure to apply the brakes, means including a valve for connecting the charging means with one end of said motor, means including a separate valve for connecting the charging means with the other end of said motor, and a part carried by said actuator and having a pair of separate actuating portions for operating said valves.

3. An automatic slack adjuster for vehicle brakes, comprising a brake operating shaft for applying the brakes, a fluid pressure actuator, a slack adjuster operatively connecting the shaft and actuator for rotating the shaft when the actuator is energized, said slack adjuster including a body member, a worm wheel carried thereby and connected with said shaft, and a worm engaged with said worm wheel and rotatably mounted in said body member for adjusting the position of the worm wheel in opposite directions to respectively reduce or increase the slack in the brakes, means including a double acting fluid motor for rotating said worm in opposite directions, means for charging said actuator with fluid pressure to apply the brakes, means including a normally closed valve for connecting the charging means with one end of said motor, means including a normally open valve for connecting the charging means with the other end of said motor, and a pair of separate cams carried by said actuator for operating said valves.

4. An automatic slack adjuster for vehicle brakes, comprising a brake operating shaft for applying the brakes, a fluid pressure actuator, a slack adjuster operatively connecting the shaft and actuator for rotating the shaft when the actuator is energized, said slack adjuster including a body member, a worm wheel carried thereby and connected with said shaft, and a worm engaged with said worm wheel and rotatably mounted in said body member for adjusting the position of the worm wheel in opposite directions to respectively reduce or increase the slack in the brakes, means including a double acting fluid motor for rotating said worm in opposite directions, means for charging said actuator with fluid pressure to apply the brakes, means controlled by movement of the actuator beyond a normal brake applying position to connect the charging means with one end of the motor, said last-named means being movable to exhaust said motor to allow residual fluid pressure therein to rotate the worm in one direction to reduce the slack, and means controlled by movement of the actuator short of a normal brake applying position to connect the charging means with the opposite end of the motor to rotate the worm in the opposite direction to increase the slack.

5. An automatic slack adjuster for vehicle brakes, comprising a brake operating shaft for applying the brakes, a fluid pressure actuator, a slack adjuster operatively connecting the shaft and actuator for rotating the shaft when the actuator is energized, said slack adjuster including a body member, a worm wheel carried thereby and connected with said shaft, and a worm engaged with said worm wheel and rotatably mounted in said body member for adjusting the position of the worm wheel in opposite directions to respectively reduce or increase the slack in the brakes, means including a double acting fluid motor for rotating said worm in opposite directions, means for charging said actuator with fluid pressure to apply the brakes, means including a valve for connecting the actuator with one end of said motor, means including a separate valve for connecting the actuator with the other end of said motor, and a part carried by the actuator and having separate cam portions respectively cooperating with said valves for operating the latter.

6. An automatic slack adjuster for vehicle brakes, comprising a brake operating shaft for applying the brakes, a fluid pressure actuator, a slack adjuster operatively connecting the shaft and actuator for rotating the shaft when the actuator is energized, said slack adjuster including a body member, a worm wheel carried thereby and connected with said shaft, and a worm engaged with said worm wheel and rotatably mounted in said body member for adjusting the position of the worm wheel to reduce the slack, a fluid motor having a piston operatively connected with said worm, means including a normally open exhaust valve for connecting the motor with the atmosphere, means for charging the actuator with fluid pressure to apply the brakes, a conduit connecting the motor with the actuator, a normally closed intake valve in said conduit, and means dependent upon movement of the actuator beyond a normal brake application to close the exhaust valve and open the intake valve to supply fluid pressure from the actuator to the motor.

7. An automatic slack adjuster for vehicle brakes, comprising a brake operating shaft for applying the brakes, a fluid pressure actuator, a slack adjuster operatively connecting the shaft and actuator for rotating the shaft when the actuator is energized, said slack adjuster including a body member, a worm wheel carried thereby and connected with said shaft, and a worm engaged with said worm wheel and rotatably mounted in said body member for adjusting the position of the worm wheel to reduce the slack, a fluid motor having a piston operatively connected with said worm, means including a normally open exhaust valve for connecting the motor with an atmospheric port, means for charging the actuator with fluid pressure to apply the brakes, a conduit connecting the motor with the actuator, a normally closed intake valve in said conduit, a check valve in the conduit between the actuator and the intake valve and arranged to permit flow of fluid from the actuator to the intake valve only, and means dependent upon movement of the actuator beyond a normal brake application to close the exhaust valve and open the intake valve to supply fluid pressure from the actuator to the motor.

8. An automatic slack adjuster for vehicle brakes, comprising a brake operating shaft for applying the brakes, a fluid pressure actuator, a slack adjuster operatively connecting the shaft and actuator for rotating the shaft when the actuator is energized, said slack adjuster including a body member, a worm wheel carried thereby and connected with said shaft, and a worm engaged with said worm wheel and rotatably mounted in said body member for adjusting the position of the worm wheel to reduce the slack, a fluid motor having a piston operatively connected with said worm, means including a normally open exhaust valve for connecting the motor with the atmosphere, means for charging the actuator with fluid pressure to apply the brakes, and means dependent upon movement of the actuator beyond a normal brake application to close the exhaust valve and conduct fluid pressure from the actuator to the motor, said first named means also including a restriction for restricting the exhaust of fluid pressure from the motor past the exhaust valve when the latter is opened during return of the actuator to brake-releasing position to allow the residual fluid pressure in the motor to operate said piston to reduce the slack.

9. An automatic slack adjuster as set forth in claim 8 wherein the connection between the piston and worm comprises a ratchet device for rotating the worm during movement of the piston in one direction and for maintaining the worm in its adjusted position when the piston returns to normal.

10. An automatic slack adjuster as set forth in claim 9 which comprises in addition, a spring for returning the piston to normal position when fluid pressure is exhausted from said motor.

11. An automatic slack adjuster for vehicle brakes, comprising a brake operating shaft for applying the brakes, a fluid pressure actuator, a slack adjuster operatively connecting the shaft and actuator for rotating the shaft when the actuator is energized, said slack adjuster including a body member, a worm wheel carried thereby and connected with said shaft, and a worm engaged with said worm wheel and having a shaft rotatably mounted in said body member for adjusting the position of the worm and worm wheel to reduce the slack, a fluid motor having a piston movable therein, a spring in said motor for maintaining said piston in a normal position, an arm connected with said piston and being rotatably mounted on said worm shaft, a ratchet wheel fixed to said worm shaft, a pawl pivotally mounted on said arm and engaging said ratchet wheel, means for charging the actuator with fluid pressure to apply the brakes, means dependent upon movement of the actuator beyond a normal brake application to charge the motor with fluid pressure, and means for restricting the exhaust of fluid pressure from the fluid motor during return of the actuator to brake-released position to allow the residual fluid pressure in the motor to move the piston against the tension of said spring and to rotate the worm shaft through said arm, said pawl and said ratchet wheel.

12. An automatic slack adjuster for vehicle brakes, comprising a brake operating shaft for applying the brakes, a fluid pressure actuator, a slack adjuster operatively connecting the shaft and actuator for rotating the shaft when the actuator is energized, said slack adjuster including a body member, a worm wheel carried thereby and connected with said shaft, and a worm engaged with said worm wheel and having a shaft rotatably mounted in said body member for adjusting the position of the worm and worm wheel in opposite directions to respectively reduce or increase the slack in the brakes, a double acting fluid motor having a piston movable in opposite directions, resilient means normally maintaining said piston in a central and neutral position, an arm connected with said piston and being rotatably mounted on said worm shaft, a ratchet wheel fixed to said worm shaft, a pawl lever pivotally mounted on said arm and having a pair of spaced apart pawls, a pawl reversing motor having a piston connected with said pawl lever, a spring normally urging the last named piston to a position where one of said pawls engages said ratchet wheel, means for charging the actuator with fluid pressure to apply the brakes, means dependent upon movement of the actuator beyond a normal brake application to charge one end of said double acting motor, means for restricting the exhaust of fluid pressure from the double acting motor during return of the actuator to brake-released position to allow the residual fluid pressure in the double acting motor to move the piston in one direction against the resilient means and to rotate the worm shaft to reduce the slack through movement of said arm, said pawl lever, said one pawl and the rachet wheel, means controlled by movement of the actuator short of a normal brake applying position to charge the opposite end of said double acting motor with fluid pressure and to simultaneously charge said pawl reversing motor to move said pawl lever to bring the other pawl into engagement with the ratchet wheel, and means for restricting the exhaust of fluid pressure from said opposite end of the double acting motor and the pawl reversing motor during return of the actuator to brake-released position to allow the residual fluid pressure in the pawl reversing motor to maintain said other pawl in engagement with the ratchet wheel and to allow the residual fluid pressure in the opposite end of said double acting motor to move the piston therein in the opposite direction against the resilient means to rotate the worm to increase the slack through movement of said arm, said pawl lever, said other pawl and the ratchet wheel.

JOHN F. SHUMAKER.

References Cited in the file of this patent

UNITED STATES PATENTS

| Number | Name | Date |
|---|---|---|
| 1,689,235 | Fowler et al. | Oct. 30, 1928 |
| 2,084,662 | Williamson | June 22, 1937 |
| 2,097,533 | Redford | Nov. 2, 1937 |